UNITED STATES PATENT OFFICE.

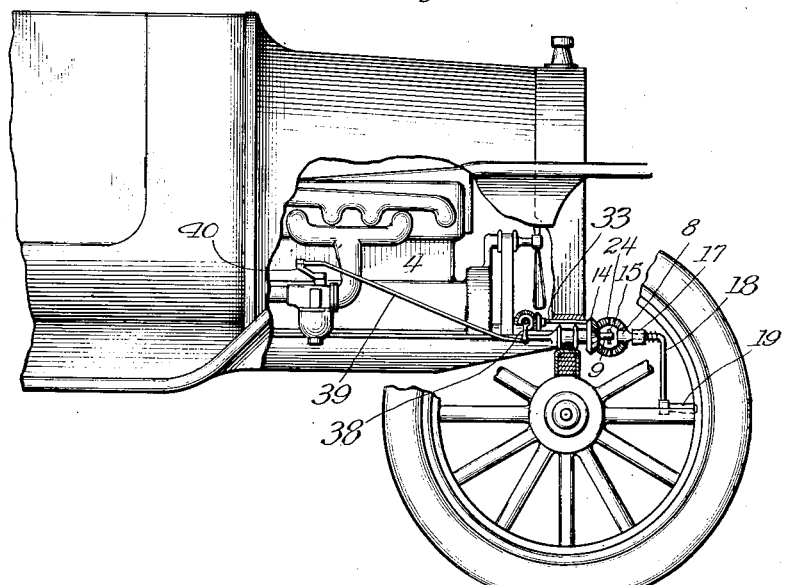
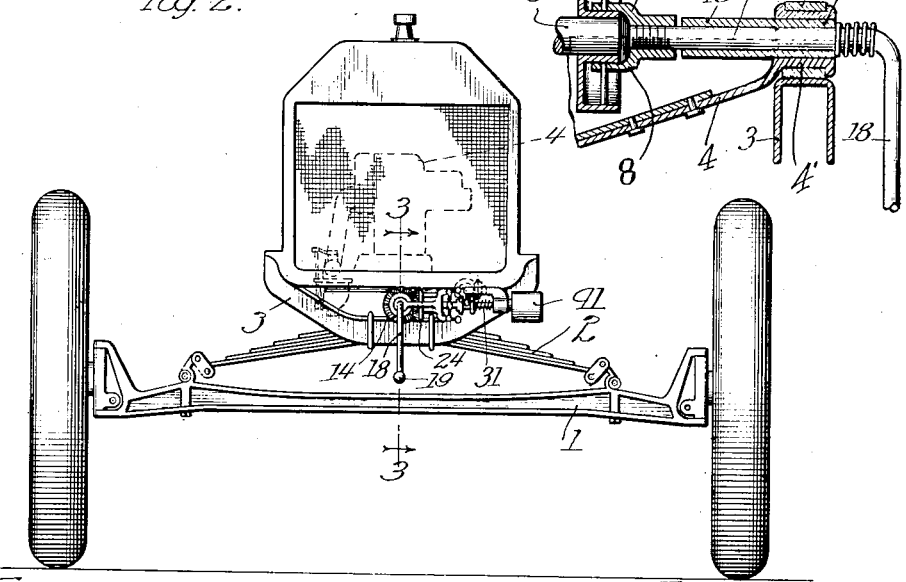

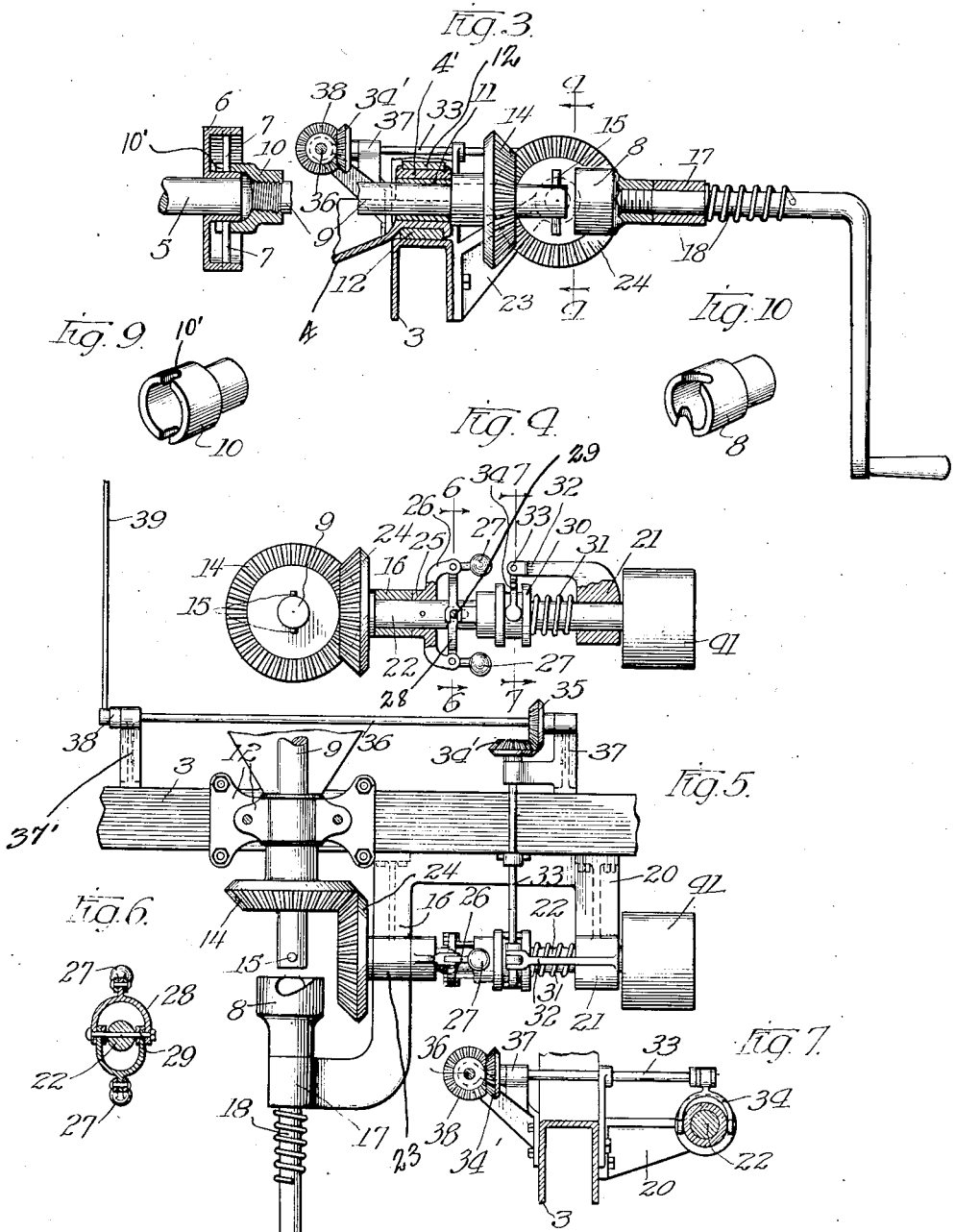

ALBERT F. MOHR, OF LAPORTE, INDIANA, ASSIGNOR TO ANDREW MOTOR MANUFACTURING COMPANY, OF MILWAUKEE, WISCONSIN, A CORPORATION OF WISCONSIN.

POWER-TRANSMISSION DEVICE.

1,331,518.  Specification of Letters Patent.  Patented Feb. 24, 1920.

Application filed March 13, 1916. Serial No. 83,754.

*To all whom it may concern:*

Be it known that I, ALBERT F. MOHR, a citizen of the United States, residing at Laporte, in the county of Laporte and State of Indiana, have invented certain new and useful Improvements in Power-Transmission Devices, of which the following is a specification.

This invention relates to an attachment applicable to a motor vehicle for the purpose of making the motor vehicle engine available for driving other machinery. It is an object of the invention to provide a device of the character described, efficient and economical in operation and simple in construction. Other objects and advantages of the invention will appear as the description to follow proceeds.

An illustrative embodiment of the invention is disclosed in the accompanying drawing.

In the drawings Figure 1 is a side elevation of a portion of a Ford automobile, partly broken away, with my attachment applied thereto.

Fig. 2 is a front elevation of a portion of a Ford automobile, showing the attachment applied.

Fig. 3 is an enlarged side elevation partly in cross section on line 3—3 of Fig. 2, showing the attachment partly broken away for clarity.

Fig. 4 is a front elevation of the attachment partly in cross section on the line 4—4 of Fig. 3.

Fig. 5 is a plan view of the attachment and parts of the vehicle frame.

Fig. 6 is a cross sectional view of line 6—6 of Fig. 4, showing specific features of the governor forming a part of the particular form of attachment herein shown.

Fig. 7 is a cross section elevation on a reduced scale of the governor device and its connection. This view is taken on line 7—7 of Fig. 4.

Fig. 8 is a cross sectional side elevation of the starting crank, as customarily applied to a Ford automobile.

Fig. 9 is a perspective view of a special fan pulley engaging device, used as a part of my attachment.

Fig. 10 is a similar view of the ordinary fan pulley engaging device, used on the end of a starting crank of a Ford car.

The device of my invention comprises a power transmission attachment, adapted to be applied to the front end of a motor vehicle. In the particular embodiment of the invention illustrated in the drawings, I have shown one special form of the attachment designed to be applied to a Ford automobile. It is of course to be understood that other specific embodiments of the invention may be made for attachment to specific motor vehicles, and that otherwise the invention is not limited to the specific features of construction shown herein.

The attachment essentially comprises, (in the form here shown), a frame (shown at 16 in Fig. 5) adapted to be applied to the front cross member 3 of an automobile frame. This frame carries a power shaft arranged transversely of the fore and aft axis of the automobile. The power shaft carries a belt pulley 41, preferably alined with the driver's seat; and is driven by a bevel gear 24, in mesh with another bevel gear 14 on a shaft, 9, which is coupled with the engine crank shaft as clearly shown in Figs. 3 and 5. The starting crank is removed from its usual location and suspended on a forward projection from the frame 16, to be engaged with the end of the shaft 9 instead of with the fan pulley 6 as is customary in Ford automobiles.

Having now briefly referred to the essential operating parts of the construction herein disclosed, I shall describe the same in detail, beginning with certain features of construction of a Ford automobile to which the device is shown as applied.

Referring to Figs. 1 and 2; the customary front axle 1 of the Ford car carries springs 2, upon which is clamped the front cross member 3. Upon the member 3 rests the forward end of the under body 4, in which is arranged an aperture 4', in line with the crank shaft 5. The crank shaft 5 at its forward end carries the fan pulley 6, equipped with transverse pin 7. With the pin 7 is engaged the clutch member 8 (Figs. 8 and 10) which is threaded to receive the rearwardly extending shank of the usual starting crank 18. The crank 18 is inclosed in a long sleeve 43 (Fig. 8), mounted in the aperture 4' in the under body 4, previously described.

I remove the sleeve 43 and the starting crank 18, together with the clutch member 8, and substitute a power shaft 9, which in effect carries forward the crank shaft of the automobile to a point in front of the radiator.

The shaft 9 (Fig. 3) at its rear end is threaded into clutch member 10 (Figs. 3 and 9) which resembles the ordinary clutch member 8 (Fig. 10) except that it is provided with straight notches 10' instead of the spiral notches of the ordinary starting crank clutch. Thus the shaft 9, threaded into the clutch member 10, and the clutch member 10, engaged with the starting pin 7, constitute an effective continuation of the crank shaft 5 of the automobile. Since the shaft 9 is a power shaft, it is desirable to provide a more adequate bearing than is necessary for the crank 18. I therefore insert the bronze bushing 11' in the aperture 4'. The projection of the body 4, which contains the aperture 4' is clamped firmly to the frame 3 by the split bearing 12, as in usual Ford construction.

Immediately forward of the bearing 4' I provide upon the shaft 9 the beveled pinion 14, which is splined or otherwise secured to the shaft. The shaft 9 is carried forward beyond the beveled pinion 14 and at its end provided with a cross pin 15, with which the starting crank 18, removed from its former place can be engaged in a manner hereinafter described.

Bolted upon the front face of the cross member 3 is a frame having forward extensions 20 and 16, as shown, in which are formed bearings 21 and 23, for a power shaft 22, arranged preferably horizontally and transversely of the fore and aft axis of the automobile. The power shaft 22 carries upon its inner end the bevel gear 24 in mesh with the bevel gear 14, previously described, and upon its outer end the belt pulley, 41. By this construction just described, it will be apparent that the power of the automobile engine is transmitted forwardly through the shaft 9, (which is coupled with the engine crank shaft), and then transversely along the shaft 22 to the belt pulley 41, from which a belt may be run forwardly to other machinery, and which is in substantial alinement with the driver's seat.

For starting the engine, I use the same crank shaft 18, which was removed from its usual position. I suspend this crank shaft in a bearing 17, formed in an offset from the forward extension 16 of the frame previously described. The clutch member 8 upon the crank shaft 18 is utilized to engage the cross pin 15 upon the forward end of the shaft 9, in precisely the same manner as it is customarily used to engage the cross pin 7 of the fan pulley.

To make the effective combination more adequate to meet varying load conditions of service, I include a governor in the combination. This governor controls the engine.

The ordinary pleasure car is not provided with a governor and I therefore add a governor, such as that shown in the specific illustrative embodiment of the invention here exhibited. Since the governor is designed to control the engine, it is immaterial in the operation of the combination as a whole, where the governor is located, so long as it is connected with the engine and operates to control the same. In adding to the automobile, both a governor and a power transmitting attachment, it is obviously convenient to apply the governor on one of the shafts of the attachment.

In the construction here shown, I locate the governor upon the shaft 22, since this shaft is directly driven by the engine and a governor located upon it will control the engine in the same manner as would a governor located upon the engine crank shaft or otherwise geared to and driven by the engine.

The fixed member of the governor comprises a sleeve 25, pinned to the shaft 22, (Fig. 4) and containing forked arms 26 in which are mounted the customary governor balls 27 on forked bell cranks 28, which surround the shaft 22 and are engaged with the pin 29, working in a slot in the shaft 22. The pin 29 is in turn engaged in a projecting lug on the grooved sleeve 30, against which acts the spring 31 which abuts at its other end against the bearing 21.

The grooved sleeve 30 controls the fork 34 pivoted at 33 in an extension 32 from the bearing 21. The pivot of the fork 34 is a shaft 33 extending through a suitable bearing in a casting 37 applied upon the rear face of the front cross member 3 and carrying a beveled pinion 34' in mesh with a beveled pinion 35. The beveled pinion 35 is fixed upon the shaft 36, also having a bearing in the casting 37 and another bearing in the casting 37', as shown in Fig. 5, and carrying at its end a crank 38 from which extends a rod 39 to the control 40 of the engine carbureter. By this means the effective combination includes a governor, driven by the engine and provided with connections to the engine, to control the same.

Having now described the specific construction of my attachment, I will explain briefly its application, operation, and certain of its advantages.

To apply the attachment of my invention, the crank shaft and sleeve 43, and clutch member 8, shown in Fig. 8, are removed, the bronze bearing 11', shaft 9, and clutch member 10 are substituted. The frame 16 is bolted upon the front cross member 3 of the motor vehicle with the beveled pinion 24 in mesh with the bevel gear 14 of the shaft 9. The starting crank is next suspended in the bearing 17, where it operates in precisely the same way as it did before. The governor connections are applied in a manner obvious from the foregoing descriptions.

The operation of the device will be obvious. Power is communicated forwardly from the crank shaft through the shaft 9 and thence to the power shaft 2 having the belt pulley 41 thereon. The inclusion of the governor in the effective combination renders the automobile engine available for indiscriminate power purposes, where conditions of varying load are encountered.

It is an important feature of the invention that the belt to be driven by the automobile engine extends forwardly from the motor vehicle, instead of at right angles thereto. Where the belt extends forwardly and particularly where it is practically in line with the driver's seat, it is a simple matter to position the automobile correctly with respect to a driven belt pulley, correctly to tighten the belt, and to make any adjustments of position necessary in operation. In cases where the belt pulley is located upon the axis of the engine crank shaft, it has been found a difficult matter correctly to tighten the belt or to adjust the position of the automobile and the driven machine so that the two belt pulleys are exactly parallel, and in alinement, and otherwise relatively position driving and driven apparatus.

Having now described my invention I claim:

1. In apparatus of the class described, a self propelled vehicle, a crank shaft therein having means for engagement with a starting crank, a short shaft designed to removably engage said crank shaft at one end and said starting crank at its other end whereby said short shaft may be interposed between said crank shaft and said crank, a gear on said shaft, a second shaft having a gear in engagement with said first mentioned gear and adapted to furnish power to farm machinery and the like, said second shaft being rotated at a speed suitable to operate said machinery.

2. In apparatus of the class described, an engine, a crank shaft therefor, having means thereon adapted to be engaged, a removable shaft adapted to engage said means and having a gear thereon, a second shaft having a gear in mesh with said first mentioned gear, said gear ratio being such as to permit said second shaft to revolve at a speed suitable for driving churns, washing machines and the like and mechanism on the second shaft whereby it is adapted to communicate power to other machinery.

3. A power attachment for motor vehicles comprising a frame adapted for attachment to the front part of the vehicle frame, a drive shaft carried by said frame adapted to engage with the crank shaft of the vehicle motor, said shaft having a driving gear mounted coaxially thereon, a transverse driving shaft carried by said frame having a coaxially mounted driven gear engaging with said driving gear, and a driven element carried by said transverse shaft, said frame adapted to engage the vehicle frame in a manner to retain the drive shaft in mesh with the crank shaft of the vehicle motor.

4. A power attachment for motor vehicles, comprising means mounted on the front part of the vehicle, including a drive shaft adapted to engage with the crank shaft of the vehicle motor, said shaft having a driving gear mounted coaxially thereon, a transverse driving shaft having a coaxially mounted driven gear engaging with said driving gear, and a driven element carried by said transverse shaft; said means being adapted to engage the vehicle structure in a manner to retain the drive shaft in engagement with the crank shaft of the vehicle motor.

5. In apparatus of the class described and in combination a motor vehicle having an engine thereon, a power shaft adapted to be removably applied to the front of the motor vehicle and at right angles to the axis thereof, means to connect said power shaft with the engine to drive the former at a speed suitable for driving other machinery, a belt pulley on the power shaft.

6. In apparatus of the class described and in combination a motor vehicle having an engine thereon, means adapted for attachment to the front of the motor vehicle, including a shaft located transversely of the fore and aft axis of the motor vehicle, means adapting said shaft to serve as the power transmitting driver for other apparatus, means connecting said shaft operatively with the engine.

7. In apparatus of the class described and in combination a motor vehicle having an engine thereon, means adapted for attachment to the front of the motor vehicle, including a shaft located transversely of the fore and aft axis of the motor vehicle, means adapting said shaft to serve as the power transmitting driver for other apparatus, means connecting said shaft directly with the engine crank shaft.

8. In apparatus of the class described and in combination a motor vehicle having an engine thereon, a removable attachment comprising a power shaft, equipped to drive other machinery, adapted to be applied to and engaged with the front of the motor vehicle, and separate means for carrying forward the power of the engine and applying the same to said power shaft.

9. In apparatus of the class described and in combination a motor vehicle having an engine thereon, an attachment comprising a power shaft, equipped to drive other machinery, adapted to be applied to, and engaged with and removed from the front of the motor vehicle, and a shaft engageable with the crank shaft of the motor vehicle, and adapted to drive said power shaft, and provisions on said last named shaft whereby the engine may be cranked.

10. A power transmitting device for motor vehicles or the like, including a belt pulley, adapted to be attached to the front of a motor vehicle and there driven at suitable speed for driving other machinery, said device including means for directing a belt driven by said belt pulley in a line substantially parallel with the fore and aft axis of the motor vehicle.

11. In a power transmitting device for motor vehicles or the like and in combination, an attachment applicable to the front of a motor vehicle to serve as a power source for driven machinery, a shaft in said attachment, a belt pulley on said shaft, and provisions on said attachment whereby power may be transmitted from said belt pulley forwardly from the motor vehicle.

12. Apparatus for transmitting power from a motor vehicle engine to other machinery, comprising a belt pulley and means to connect the same with the front of a motor vehicle, in driving relation with the motor vehicle engine, and in a position wherein the axis of the belt pulley is transverse to the fore and aft axis of the motor vehicle.

13. Apparatus for transmitting power from a motor vehicle engine to other machinery, comprising a shaft, a belt pulley thereon, and means to connect said shaft, operatively, with the motor vehicle engine, in a position transverse to the fore and aft axis of the motor vehicle, and at the front end of the motor vehicle.

14. Apparatus for transmitting power from a motor vehicle engine to other machinery, comprising a shaft, a belt pulley thereon, and means to connect and disconnect said shaft, with the motor vehicle engine, in a position transverse to the fore and aft axis of the motor vehicle, and at the front end of the motor vehicle, said belt pulley being located substantially in line with and forward of the driver's seat in the motor vehicle, whereby the belt pulley may be conveniently alined and positioned with respect to the driven machinery by an operator in said driver's seat.

15. A unitary power transmission attachment for use in transmitting power from a motor vehicle engine to other machinery, comprising a support, means removably to connect said support to the front of a motor vehicle, a shaft in said support adapted to lie transversely of the fore and aft axis of the motor vehicle when the support is attached thereto, means to connect said shaft with the crank shaft of the motor vehicle engine, and starting means operable through said last named means to start the engine.

16. A unitary power transmission attachment for use in transmitting power from a motor vehicle engine to other machinery, comprising a support, means removably to connect said support to the front of a motor vehicle, a shaft mounted in said support adapted to lie transversely of the fore and aft axis of the motor vehicle when the support is attached thereto, means to connect said shaft with the crank shaft of the motor vehicle engine, and means on said transverse shaft for driving other machinery.

17. In apparatus of the class described and in combination a motor vehicle having an engine thereon, means adapted to be removably attached to the front of the motor vehicle and including a plurality of shafts combined and arranged so as to transmit the power of the motor vehicle to a belt extending forwardly from the motor vehicle.

18. A power transmitting attachment for motor vehicles comprising a support applicable to the front of the motor vehicle frame, bearings in said support alined transversely of the fore and aft axis of the motor vehicle, a shaft in said bearings, a bevel gear at one end of said shaft and a belt pulley at the other end thereof, a short shaft having at one end provision to engage the crank shaft of the motor vehicle, and at the other end provision to be engaged by the starting crank, a bevel gear between said provisions on said short shaft, and in mesh with the first mentioned bevel gear, a forward extension of said support, and a starting crank slidably and rotatably mounted in said extension and adapted to be utilized to start the engine by turning the engine crank shaft through said short shaft, substantially as described.

19. In apparatus of the class described the motor vehicle frame 3, the crank shaft 5, the short shaft 9, the bevel gear 14, the bevel gear 24 meshed therewith, the shaft 22 carrying said last named bevel gear, the frame 16, said shaft 22 and the belt pulley 41 on said shaft 22.

In witness whereof I hereunto subscribe my name to this specification in the presence of two witnesses.

ALBERT F. MOHR.

Witnesses:
I. V. CURRAN,
SEBASTIAN HINTON.